United States Patent
Seol

(10) Patent No.: US 7,561,849 B2
(45) Date of Patent: Jul. 14, 2009

(54) METHOD OF POWER CONTROL AND ACKNOWLEDGEMENT CONTROL FOR F-ACKCH

(75) Inventor: Jee Woong Seol, Gunpo-si (KR)

(73) Assignee: LG-Nortel Co., Ltd., Seoul (KR)

( * ) Notice: Subject to any disclaimer, the term of this patent is extended or adjusted under 35 U.S.C. 154(b) by 216 days.

(21) Appl. No.: 10/577,072

(22) PCT Filed: Dec. 2, 2004

(86) PCT No.: PCT/KR2004/003160

§ 371 (c)(1),
(2), (4) Date: Apr. 24, 2006

(87) PCT Pub. No.: WO2005/055485

PCT Pub. Date: Jun. 16, 2005

(65) Prior Publication Data

US 2007/0077954 A1 Apr. 5, 2007

(30) Foreign Application Priority Data

Dec. 2, 2003 (KR) ............ 10-2003-0086842

(51) Int. Cl.
*H04B 1/00* (2006.01)
(52) U.S. Cl. .................. 455/69; 455/522
(58) Field of Classification Search ........... 455/522, 455/69, 452.2
See application file for complete search history.

(56) References Cited

U.S. PATENT DOCUMENTS

| | | | | |
|---|---|---|---|---|
| 5,930,242 | A | 7/1999 | Mimura | 370/331 |
| 2002/0150064 | A1 | 10/2002 | Lucidarme | 370/333 |
| 2002/0154610 | A1* | 10/2002 | Tiedemann et al. | 370/329 |
| 2002/0172217 | A1* | 11/2002 | Kadaba et al. | 370/443 |
| 2003/0031119 | A1* | 2/2003 | Kim et al. | 370/200 |
| 2003/0103481 | A1* | 6/2003 | Heo et al. | 370/335 |
| 2003/0157953 | A1* | 8/2003 | Das et al. | 455/522 |
| 2005/0032536 | A1* | 2/2005 | Wei et al. | 455/517 |

FOREIGN PATENT DOCUMENTS

| | | |
|---|---|---|
| EP | 0946070 | 9/1999 |
| EP | 1146758 | 10/2001 |
| JP | 10065612 | 3/1998 |

* cited by examiner

Primary Examiner—Tu X Nguyen
(74) Attorney, Agent, or Firm—KED & Associates, LLP

(57) ABSTRACT

A power control method of a forward-acknowledgement channel and an acknowledgement control method are provided by which acknowledgement or non-acknowledgement information can be received for a boost mode operation used for a quality of service (Qos). The power control method may include receiving packet transmission information in a base station and determining a power of a transmission signal transmitted via the forward-acknowledgement channel (F-ACKCH) using an increment for a reference transmission power value of a boost mode in case that the packet transmission control information contains a boost operation.

6 Claims, 1 Drawing Sheet

METHOD OF POWER CONTROL AND ACKNOWLEDGEMENT CONTROL FOR F-ACKCH

TECHNICAL FIELD

The present invention relates to a power control method of a forward-acknowledgement channel (F-ACKCH) and acknowledgement control method thereof, and more particularly, to a power control method of a forward-acknowledgement channel (F-ACKCH) in mobile communications and acknowledgement control method thereof.

BACKGROUND ART

Generally, a terminal uses a threshold in deciding reception success information (ACK) or reception failure information (NCK) via forward-acknowledgement channel (hereinafter abbreviated F-ACKCH).

FIG. 1 is a diagram for explaining a general method of deciding a reception acknowledgment (ACK) according to a threshold.

Referring to FIG. 1, it is decided as acknowledgement (ACK) if a reception level is equal to or greater than a threshold. And, it is decided as non-acknowledgement (NCK) if a reception level is smaller than a threshold. A false alarm probability for deciding a NCK signal as an ACK signal incorrectly and a missing probability for deciding an ACK signal as a NCK signal are preferentially determined. And, a threshold is adjusted to fit the probabilities. The false alarm probability for deciding a NCK signal as an ACK signal incorrectly is usually set lower in general.

However, if the false alarm probability is incorrect, failure is regarded as success. Hence, retransmission by signaling is needed after a predetermined time has passed.

DISCLOSURE OF THE INVENTION

Accordingly, the present invention is directed to a power control method of a forward-acknowledgement channel (F-ACKCH) and acknowledgement control method thereof that substantially obviate one or more of the problems due to limitations and disadvantages of the related art.

An object of the present invention is to provide a power control method of a forward-acknowledgement channel and acknowledgement control method thereof, by which a quality of service (QoS) is met in a manner of notifying a presence or non-presence of acknowledgement of a packet in a boost mode.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a transmission power control method of a forward-acknowledgement channel according to the present invention includes the steps of receiving packet transmission information in a base station and determining a power of a transmission signal transmitted via the forward-acknowledgement channel (F-ACKCH) using an increment for a reference transmission power value of a boost mode in case that the packet transmission control information contains a boost operation.

To further achieve these and other advantages and in accordance with the purpose of the present invention, an acknowledgement control method of a forward-acknowledgement channel according to the present invention includes the steps of receiving acknowledgement information in a mobile station, determining a boost mode threshold using an increment for a boost mode reference threshold in case of a boost mode operation, and deciding a presence or non-presence of acknowledgement using the threshold.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

BEST MODE FOR CARRYING OUT THE INVENTION

Reference will now be made in detail to the preferred embodiments of the present invention, examples of which are illustrated in the accompanying drawings.

First of all, a reverse-packet data channel (hereinafter abbreviated R-PDCH) raises transmission efficiency using a hybrid-automatic repeat request (hereinafter abbreviated H-ARQ) system. Namely, a base station transmits a reception success (ACK) signal in case of succeeding in decoding of a received sub-packet. Once receiving the ACK signal, a mobile station transmits a sub-packet of a next packet. Meanwhile, in case of deciding a result of decoding the received sub-packet as a transmission failure, the base station transmits a reception failure (NCK) signal to the mobile station. Once receiving the NCK signal, the mobile station transmits a next sub-packet to the base station. Such a transmission method physically carries out retransmission unlike a method by signaling, thereby receiving a packet successfully and quickly using less energy.

Thus, in case of receiving to decode a packet via R-PDCH, the base station transmits information of acknowledgement or non-acknowledgement to the mobile station. Namely, the base station transmits an ACK signal or a NCK signal to the mobile station via a forward acknowledgement channel (hereinafter abbreviated F-ACKCH).

Figure 1:
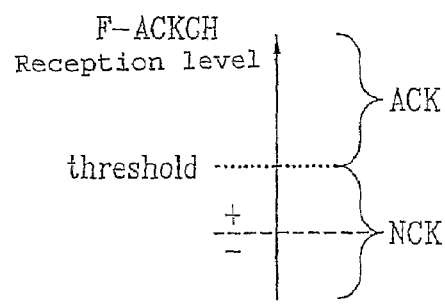
FIG. 1 is a diagram for explaining a general method of deciding a reception acknowledgment (ACK) according to a threshold.
Figure 2:
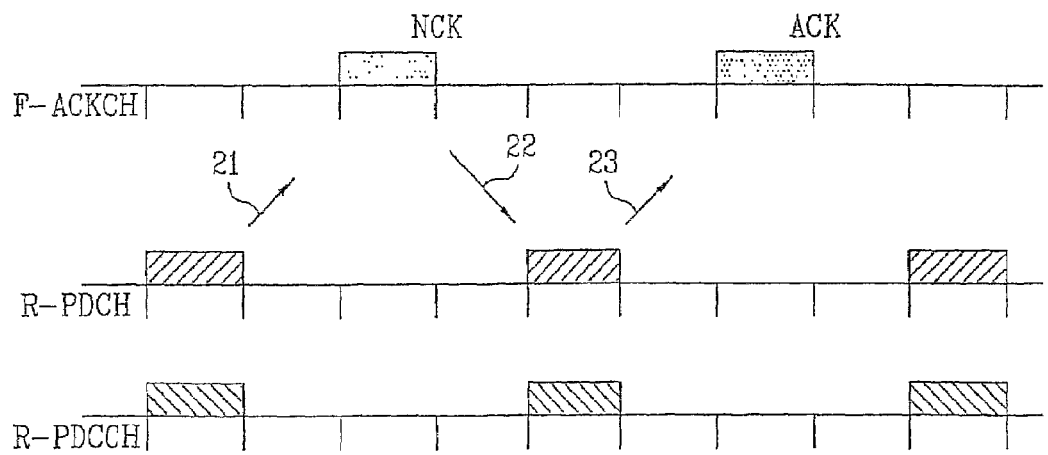
FIG. 2 is a diagram of a hybrid-automatic repeat request (H-ARQ) system in a forward-acknowledgement channel (F-ACKCH) according to one embodiment of the present invention.

FIG. 2 is a diagram of a hybrid-automatic repeat request (H-ARQ) system in a forward-acknowledgement channel (F-ACKCH) according to one embodiment of the present invention.

Referring to FIG. 2, once a sub-packet is transmitted to a base station via R-PDCH (21), the base station decodes the received sub-packet to decide a transmission success or failure. In doing so, a unit of each frame can be set to 10 ms. If a NCK signal is transmitted from the base station to a mobile station in case of the decoding failure of the sub-packet transmitted via R-PDCH (22), a next sub-packet is transmitted after an elapse of a predetermined time (23). Such a retransmission keeps being repeatedly performed until an ACK signal is received or until the retransmissions are repeated by a maximum number of predefined times.

In case of transmitting a packet using a boost identifier, a boost identifier of a reverse-packet data control channel (hereinafter abbreviated R-PDCCH) informs a presence or non-presence of a boost mode operation of an R-PDCH packet. In the boost mode, a failure of a packet is reduced below 1% using a raised traffic to pilot signal ratio. In doing so, if a conventional F-ACKCH is used for the boost mode or if the terminal uses a same threshold for the boost mode operation, reliability of F-ACKCH is affected. Namely, if a packet failure rate approaches 0.01% due to the boost mode operation, characteristics of the boost mode operation may be lost by the reliability of F-ACKCH. Hence, a method of raising the reliability of F-ACKCH according to the boost mode operation is needed.

Meanwhile, the reverse-packet data control channel (hereinafter abbreviated R-PDCCH) contains information of a packet transmitted over the R-PDCH and may be configured with 6-bits. And, the R-PDCCH includes a service data unit length (hereinafter abbreviated SDU_length), a sub-packet identification (hereinafter abbreviated SPID), and a boost indicator, using the 6-bits.

The SDU_length is a value indicating a length of an information bit of the R-PDCH and the SPID indicates a sequence of a sub-packet to be retransmitted. A high quality of service (hereinafter abbreviated QoS) is needed for important information. In this case, QoS indicates whether a traffic to pilot signal ratio is raised to meet a necessary transmission QoS.

The F-ACKCH includes several sub-channels each of which is assigned to a corresponding user. In sending an ACK signal using the F-ACKCH, a modulation symbol is set to '+1'. Yet, no transmission is made for informing NCK information. Moreover, in sending the ACK signal, transmission power of each of the sub-channels is determined according to a user's channel status and information of a reverse-channel quality indicator channel (hereinafter abbreviated R-CQICH) and a reverse power control bit can be utilized to grasp the channel status.

ack_gain, transmitted for ACK information means transmission power allocated to an $i^{th}$ user. And, nck_gain, transmitted for NCK information is 0. Namely, the F-ACKCH becomes gated off. 'j' in $\Delta_{ack}(j,k)$ or $\Delta_{nck}(j,k)$ means a length of a payload determined according to SDU_length of the R-PDCCH. And, 'k' in $\Delta_{ack}(j,k)$ or $\Delta_{nck}(j,k)$ is a value determined according to the SPID of the R-PDCCH to mean a sequence of a corresponding sub-packet. Namely, $\Delta_{ack}(j,k)$ or $\Delta_{nck}(j,k)$ can vary according to the SDU_length and the SPID.

Equation 1 is provided for calculating a gain necessary for determining transmission power of an ACK signal in a boost mode.

$$\Delta\_ack\_gain_i = ack\_gain_i + \Delta_{ack}(j,k) \quad \text{[Equation 1]}$$

Equation 2 is provided for calculating a gain necessary for determining transmission power of a NCK signal in a boost mode.

$$\Delta\_nck\_gain_i = nck\_gain_i + \Delta_{nck}(j,k) \quad \text{[Equation 2]}$$

A method of controlling an ACK signal power in a boost mode according to a first embodiment of the present invention is explained as follows.

First of all, in case that a boost indicator of R-PDCCH indicates a boost operation (boost mode), it is able to lower a false alarm probability for deciding a NCK signal as an ACK signal incorrectly and a missing probability for deciding an ACK signal as a NCK signal by raising a power to a predetermined increment for an ACK signal of a sub-packet. Namely, $\Delta\_ack\_gain_i = ack\_gain_i + \Delta_{ack}(j,k)$ is determined using Equation 1 and $\Delta_{nck}(j,k)$ is set to 0.

A method of controlling a NCK signal power in a boost mode according to a second embodiment of the present invention is explained as follows.

First of all, in case that a boost indicator of R-PDCCH indicates a boost operation (boost mode), $\Delta_{ack}(j,k)$ is set to 0 and a value of $\Delta_{nck}(j,k)$ is determined to control a power of a NCK signal. In the method according to the second embodiment of the present invention, the value of $\Delta_{nck}(j,k)$ can be determined by Equation 3 or Equation 4.

$$\Delta_{nck}(j,K) = -ack\_gain_i \quad \text{[Equation 3]}$$

$$\Delta_{nck}(j,K) = -\{ack\_gain_i + \Delta_{ack}(j,k)\} \quad \text{[Equation 4]}$$

In Equation 4, the value of $\Delta_{nck}(j,k)$ can be set smaller. Since the signal is transmitted in the method according to the second embodiment of the present invention in case of reception failure (NCK) as well, a mobile station can decide reception success or failure in a manner of changing a previous threshold. Meanwhile, if the mobile station does not change the previous threshold, it is able to lower the false alarm probability for deciding reception failure (NCK) as reception success (ACK).

A method of controlling an ACK signal power and a NCK signal power in a boost mode according to a third embodiment of the present invention is explained as follows. The third embodiment provides a method of controlling an ACK signal power and a NCK signal power using Equation 1 and Equation 2. Namely, $\Delta_{ack}(j,k)$ and $\Delta_{nck}(j,k)$ in Equation 1 and Equation 2 are individually adjusted to control the transmission power.

Meanwhile, explained in the following is a method of lowering a false alarm probability for deciding a NCK signal as an ACK signal incorrectly and a missing probability for deciding an ACK signal as a NCK signal in a manner of adjusting a threshold for deciding an ACK signal in a mobile station.

FIG. 2 shows a method of deciding reception success or failure using a threshold. Referring to FIG. 2, if a received F-ACKCH power is lower than a threshold, it is decided as reception failure (NCK). If a received F-ACKCH power is higher than a threshold, it is decided as reception success (ACK). Besides, the threshold can be determined by Equation 5 with reference to SDU_length and SPID.

$$boost\_threshold = threshold + \Delta_{th}(j,k) \quad \{\text{Equation 5}\})$$

In $\Delta_t(j,k)$, 'j' means a length of a payload determined according to SDU_length of the R-PDCCH. And, 'k' in $\Delta_{ack}(j,k)$ or $\Delta_{nck}(j,k)$ is a value determined according to the SPID of the R-PDCCH to mean a sequence of a corresponding sub-packet. By adjusting a value of boost_threshold using $\Delta_t(j,k)$, it is able to lower a false alarm probability for deciding a NCK signal as an ACK signal incorrectly and a missing probability for deciding an ACK signal as a NCK signal.

The above-described method of the present invention can be implemented by a program readable via a computer and are stored in a record medium such as CD-ROM, RAM, floppy disc, hard disc, magneto optical disc, etc.

INDUSTRIAL APPLICABILITY

Accordingly, the present invention is applicable to a mobile communication field.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A transmission power control method of a forward-acknowledgement channel, comprising:
   receiving packet transmission control information in a base station, the received packet transmission control information including a boost identifier to identify a boost operation; and
   determining a power of a transmission signal to be transmitted from the base station via the forward-acknowledgement channel (F-ACKCH) using an increment for a reference transmission power value of a boost mode when the packet transmission control information contains the boost identifier to identify the boost operation, wherein the increment for the reference transmission power value is determined based on a sub-packet identification (SPID) or a service data unit length (SDU length) transmitted via a reverse-packet data control channel, and wherein the power of the transmission signal to be transmitted via the forward-acknowledgement channel (F-ACKCH) is determined by adding the increment to the reference transmission power value of the boost mode when the signal is an acknowledgement (ACK) signal.

2. The transmission power control method of claim 1, wherein the power of the transmission signal to be transmitted via the forward-acknowledgement channel (F-ACKCH) is determined by adding the increment to the reference transmission power value of the boost mode when the signal is a non-acknowledgement (NACK) signal.

3. The transmission power control method of claim 1, wherein the SDU_length represents a length of a payload.

4. The transmission power control method of claim 1, wherein the SPID represents a sequence of a sub-packet.

5. The transmission power control method of claim 1, wherein the transmission signal comprises an acknowledge signal.

6. The transmission power control method of claim 1, wherein the transmission signal comprises a non-acknowledge signal.

* * * * *